United States Patent
Kaihotsu et al.

(10) Patent No.: US 8,950,036 B2
(45) Date of Patent: Feb. 10, 2015

(54) DUST REMOVER FOR CHARGE-COUPLED DEVICE

(75) Inventors: Wataru Kaihotsu, Suwon-si (KR); Jeong-Hyun Shim, Seoul (KR); Jin-Won Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 905 days.

(21) Appl. No.: 12/965,239

(22) Filed: Dec. 10, 2010

(65) Prior Publication Data
US 2011/0138569 A1 Jun. 16, 2011

(30) Foreign Application Priority Data
Dec. 11, 2009 (KR) .................. 10-2009-0122933

(51) Int. Cl.
H04N 5/225 (2006.01)

(52) U.S. Cl.
CPC .................. H04N 5/2254 (2013.01)
USPC ............... 15/301; 359/509; 396/535

(58) Field of Classification Search
CPC ......... B08B 5/04; G03B 17/02; H04N 5/2254
USPC ......... 15/309.1, 345, 346, 347, 301; 348/373, 348/374, 375, 376; 359/509; 396/535
See application file for complete search history.

(56) References Cited

U.S. PATENT DOCUMENTS

| | | | | |
|---|---|---|---|---|
| 2,818,595 | A * | 1/1958 | Rosewall | 15/309.1 |
| 4,240,691 | A * | 12/1980 | Holmqvist et al. | 359/509 |
| 5,070,348 | A * | 12/1991 | Hayakawa et al. | 396/26 |
| 5,376,168 | A * | 12/1994 | Inculet | 96/54 |
| 6,902,630 | B2 * | 6/2005 | Ernst et al. | 134/37 |
| 7,222,388 | B2 * | 5/2007 | Sugihara | 15/310 |
| 8,009,979 | B2 * | 8/2011 | Shirono | 396/535 |
| 8,454,245 | B2 * | 6/2013 | Overskeid et al. | 396/427 |
| 2005/0275738 | A1 * | 12/2005 | Arai | 348/335 |
| 2006/0242783 | A1 * | 11/2006 | Peterson et al. | 15/304 |
| 2008/0192435 | A1 * | 8/2008 | Yamamiya | 361/703 |
| 2008/0205878 | A1 * | 8/2008 | Owashi | 396/429 |
| 2008/0285132 | A1 * | 11/2008 | O'Kane | 359/509 |

FOREIGN PATENT DOCUMENTS

| | | | | |
|---|---|---|---|---|
| JP | 55048739 | A | * | 4/1980 |
| JP | 07072541 | A | * | 3/1995 |
| JP | 08339017 | A | * | 12/1996 |
| JP | 2001091807 | A | * | 4/2001 |

(Continued)

OTHER PUBLICATIONS

Machine English Language Translation of JP2003319218A, Sep. 25, 2013, Industrial Property Digital Library.*

(Continued)

*Primary Examiner* — Joseph J Hail
*Assistant Examiner* — Joel Crandall
(74) *Attorney, Agent, or Firm* — The Farrell Law Firm, P.C.

(57) ABSTRACT

A dust remover according to the present disclosure forms an air flow in a space formed between a charge-coupled device and a shutter unit, and removes dust on a surface of the charge-coupled device, the dust remover comprising an air injector having a plurality of air injecting holes; an air discharger which is installed on a surface facing the air injector, and has at least one air discharging hole which is smaller than the air injecting hole; and an exhausting dust collecting filter which is installed in the air discharger, and collects dust in the air being discharged.

10 Claims, 6 Drawing Sheets

(56) References Cited

FOREIGN PATENT DOCUMENTS

| | | | | |
|---|---|---|---|---|
| JP | 2003319218 | A | * | 11/2003 |
| JP | 2004354446 | A | * | 12/2004 |
| JP | 2006060429 | A | * | 3/2006 |
| JP | 2007-189670 | | | 7/2007 |
| JP | 2008-061108 | | | 3/2008 |
| JP | 2008154127 | A | * | 7/2008 |
| JP | 2009071722 | A | * | 4/2009 |
| JP | 2010130081 | A | * | 6/2010 |

OTHER PUBLICATIONS

English language abstract of JP 2008-061108, published Mar. 13, 2008.
Machine English language translation of JP 2008-061108, published Mar. 13, 2008.
English language abstract of JP 2007-189670, published Jul. 26, 2007.
Machine English language translation of JP 2007-189670, published Jul. 26, 2007.

* cited by examiner

DUST REMOVER FOR CHARGE-COUPLED DEVICE

CROSS-REFERENCE TO RELATED APPLICATION

This application claims priority from Korean Patent Application No. 10-2009-122933, filed in the Korean Intellectual Property Office on Dec. 11, 2009, the disclosure of which is incorporated herein by reference in its entirety.

BACKGROUND

1. Field of the Exemplary Embodiments

Apparatuses consistent with embodiments of the invention relate to a dust remover capable of removing substances such as dust attached to a surface of a charge-coupled device used in a digital camera etc.

2. Description of the Prior Art

An image photographing apparatus such as a digital camera includes a charge-coupled device for converting image information into electronic signals. If there is dirt such as dust on the surface of the charge-coupled device, the image information on the portion where the dust is attached is not converted correctly, causing pollution or deterioration of the quality of the picture.

Technologies using vibration, air flow, and external devices are generally used to remove dust on the surface of charge-coupled devices. Technologies using vibration remove dust by vibrating a low pass filter on a front surface of a charge-coupled device using piezoelectrics (PZT).

Technologies using air flow use a flow of air generated by mirrors operating back and forth to float dust, so that the dust can be collected in an air hole.

Technologies using external devices remove dust using an additional device. For example, an air suction device may be used to inhale air and to form an air flow near the charge-coupled device so that the air flow can remove dust attached to the surface of the charge-coupled device.

SUMMARY OF THE INVENTION

Embodiments of the present invention relate to a dust remover which may form an air flow in a space formed between a charge-coupled device and a shutter unit, and may remove dust on a surface of the charge-coupled device, the dust remover including: an air injector which has a plurality of air injecting holes; an air discharger which is installed on a surface facing the air injector, and has at least one air discharging hole which is smaller than the air injecting hole; and an exhausting dust collecting filter which is installed in the air discharger, and collects dust in the air being discharged.

BRIEF DESCRIPTION OF THE DRAWINGS

The above and/or other aspects of the present disclosure will be more apparent by describing certain embodiments with reference to the accompanying drawings, in which.

DETAILED DESCRIPTION OF THE PREFERRED EMBODIMENTS

Figure 1:
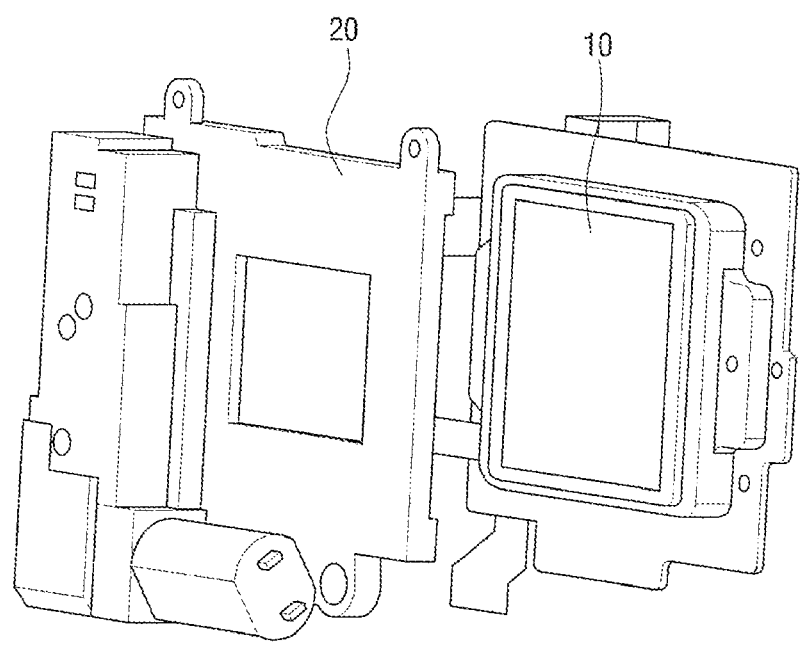
FIGS. 1 and 2 are perspective views illustrating a combination relationship of a charge-coupled device and a shutter unit according to an embodiment of the invention.
Figure 2:
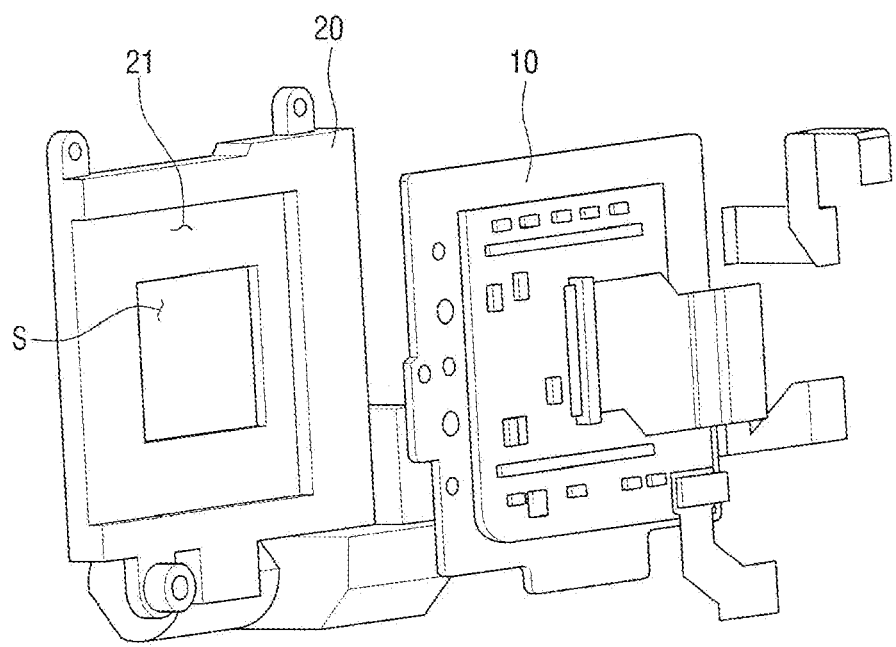

As illustrated in FIGS. 1 and 2, a dust remover according to an embodiment of the invention may generate an air flow in a space formed between a charge-coupled device 10 and a shutter unit 20, to remove dust attached to a surface of the charge-coupled device 10. The dust remover may form an air flow in the space S formed between the charge-coupled device 10 and the shutter unit 20, and use a shear force of the flowing air to detach the dust attached to the surface of the charge-coupled device 10.

As illustrated in FIGS. 1 to 4, a dust remover according to an embodiment of the invention may comprise an air injector 100, an air discharger 200, and a dust collecting filter 300. The air injector 100 and the air discharger 200 may be installed wherever they can make the air flow in the space S.

As illustrated, the air injector 100 and the air discharger 200 may be disposed in an accommodating groove 21 for the charge-coupled device 10 of the shutter unit 20, the air injector 100 being disposed in an upper side of the accommodating groove 21 and the air discharger 200 being disposed in a lower side of the accommodating groove 21. In this configuration, the air injector 100 and the air discharger 200 are arranged in the gravity direction, and thus air may flow smoothly between the two units. Furthermore, as air flow can be generated in a direction parallel with the surface of the charge-coupled device 10, a shear force of the air flow could remove dust attached to the surface of the charge-coupled device 10.

The air injector 100 may have a plurality of air injecting holes 101 each of which is disposed at a certain distance from one another and to inject air in a same direction. There may be various methods for injecting air through the air injecting holes 101, which will be explained in greater detail hereinafter.

The air discharger 200 may be installed to face the air injector 100, and the air discharger 200 may have a smaller number of air discharging holes 201 than the air injecting holes 101 formed in the air injector 100. For example, less than five air discharging holes 201 may be provided. The size of an air discharging hole 201 may be smaller than the size of an air injecting hole 101, and an air discharging hole 201 may be formed approximately at the middle of the air discharger 200. An air discharging hole 201 may be connected to the outside of the shutter unit 20 by an air discharging pipe 202.

The dust collecting filter 300 may comprise an inhaled dust collecting filter 310 which may filter air being inhaled into the air injector 100 and an exhausting dust collecting filter 320 which may collect/remove dust in the air being discharged through the air discharger 200. The inhaled dust collecting filter 310 may be omitted in some embodiments. The dust collecting filter 300 may be an electret filter. The dust collecting filter 30Q may be provided in a detachable structure, and thus can be exchanged for a new one after being used for a period of time. In addition, it is possible to install at one end of the air discharging pipe 202 an additional filter 330 made of an air permeable water-proof material such as Gore-Tex which can be penetrated by air and not water.

Figure 3:
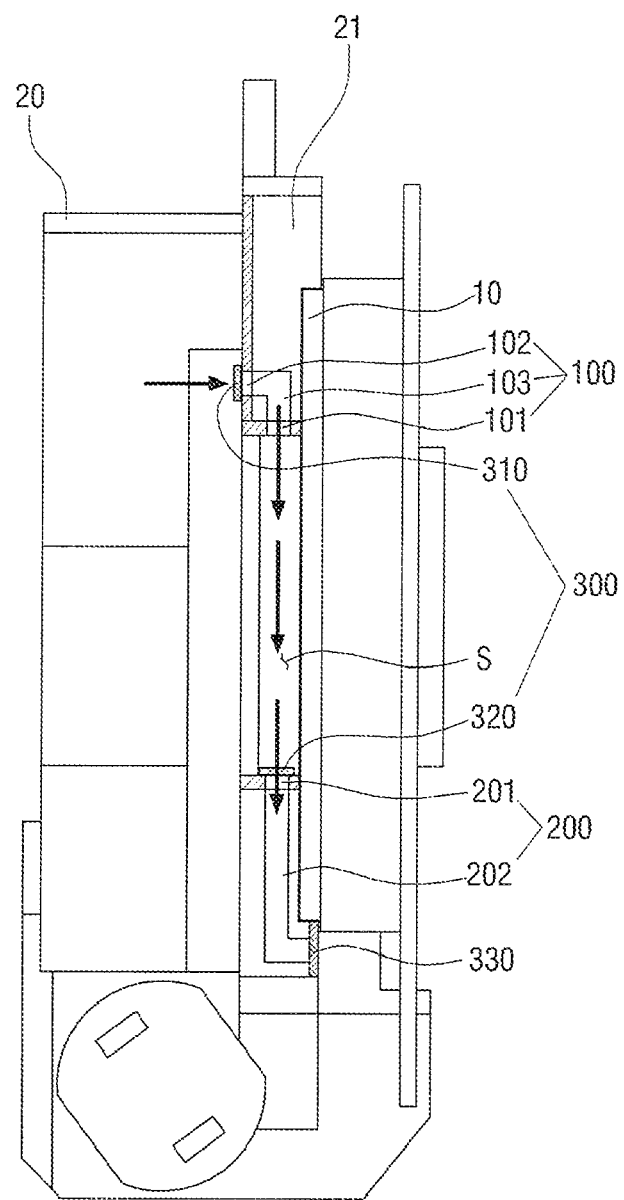
FIG. 3 is a section view illustrating a configuration of a dust remover having an air injector according to an embodiment of the invention.

FIG. 3 illustrates a dust remover according to an embodiment of the invention, wherein air can be provided to the air injector 100 using a zoom lens (not illustrated) installed on a front surface of the shutter unit 20 or a fan installed in an air cap.

A camera unit may have a zoom lens having a plurality of tubes, and the zoom lens can be moved back and forth using each tube, so as to adjust the focal length. An inner volume of the zoom lens may change during zoom-in/zoom-out. The zoom-in/zoom-out movements may be employed as pumping movements, causing air to flow into the air injector 100. Furthermore, it is possible to use a change of volume by a parking movement of the zoom lens when the camera is powered off as an air pumping movement. When there is no zoom lens, it is possible to install an air cap on a camera mount and operate a rotatable fan installed inside the cap, providing air to the air injector.

When air is injected into the shutter unit 20 using the zoom lens or the fan inside the air cap, the shutter which may be located approximately in the middle of the shutter unit 20 may be closed during a waiting mode, and thus the injected air would flow through an air inhaling hole 102. On a front surface of the air inhaling hole 102, the inhaled dust collecting filter 310 may be installed, removing dust in the injected air. The air injected into the air inhaling hole 102 may be divided by a plurality of air injecting holes 101 through an air tube 103 connected to an inside of the shutter unit 20, and then injected in a certain pressure. The injecting direction of the air injecting holes 101 may be formed to inject air in a direction parallel with the surface of the charge-coupled device 10. The air injected from the air injecting holes may be injected in the arrow direction as illustrated, and this air flow forms a shear force on the surface of the charge-coupled device 10. Using this shear force, it is possible to detach/remove dust attached to the surface of the charge-coupled device 10.

The removed dust may be collected together with the flowing air in the exhausting dust collecting filter 320, which may consist of the electret filter etc., and the filtered air may be discharged through the air discharging hole 201. The exhausting dust collecting filter 320 may be installed to filter the air penetrating the air discharging hole 201. The air penetrating the air discharging hole 201 may be discharged outside the shutter unit 20 through the air discharging pipe 202, and a filter made of an air permeable water-proof material such as Gore-Tex at one end of the air discharging pipe 202 may be installed to prevent penetration of water from outside.

Figure 4:
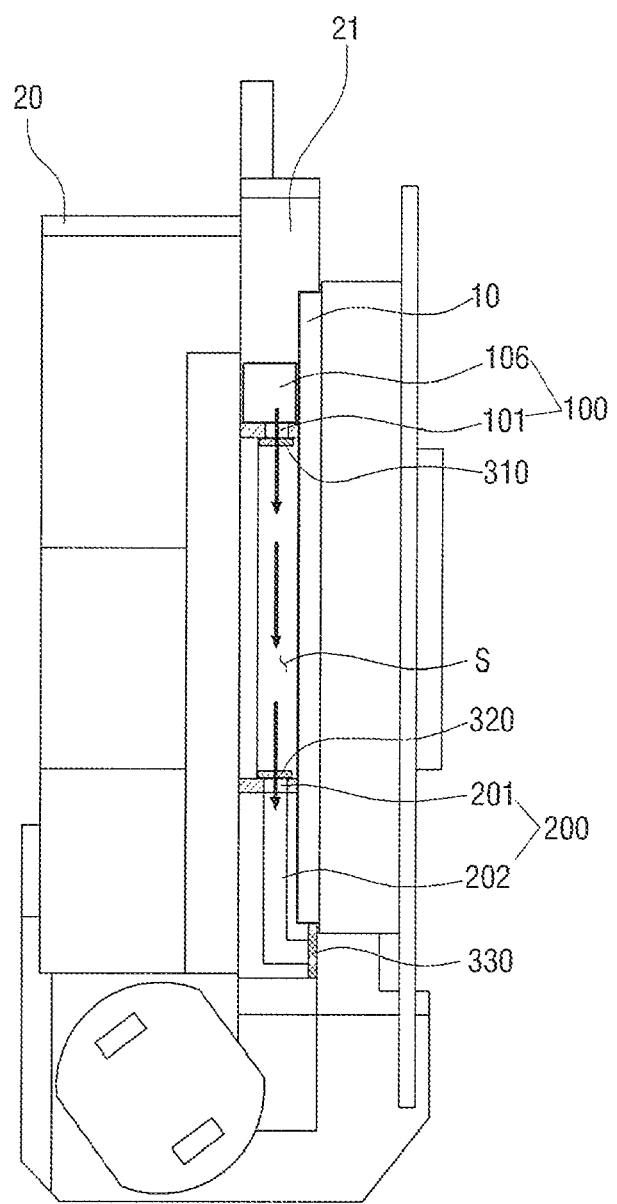
FIG. 4 is a section view illustration a configuration of a dust remover having an air injector according to an embodiment of the invention.
Figure 5:
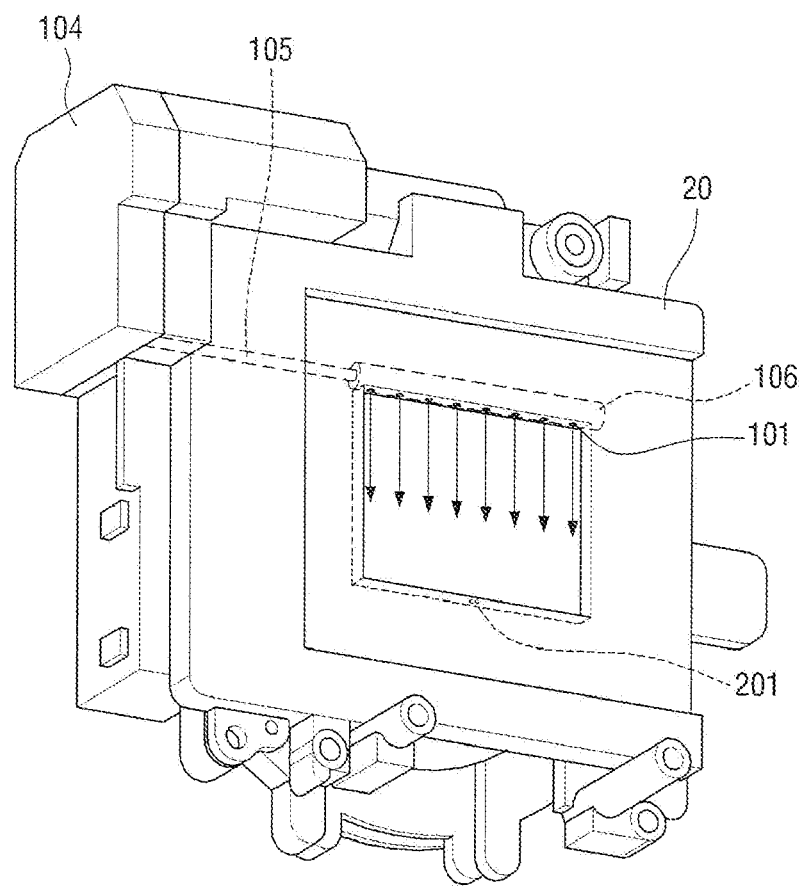
FIGS. 5 and 6 are perspective views illustrating the dust remover according to the configuration of FIG. 4.
Figure 6:
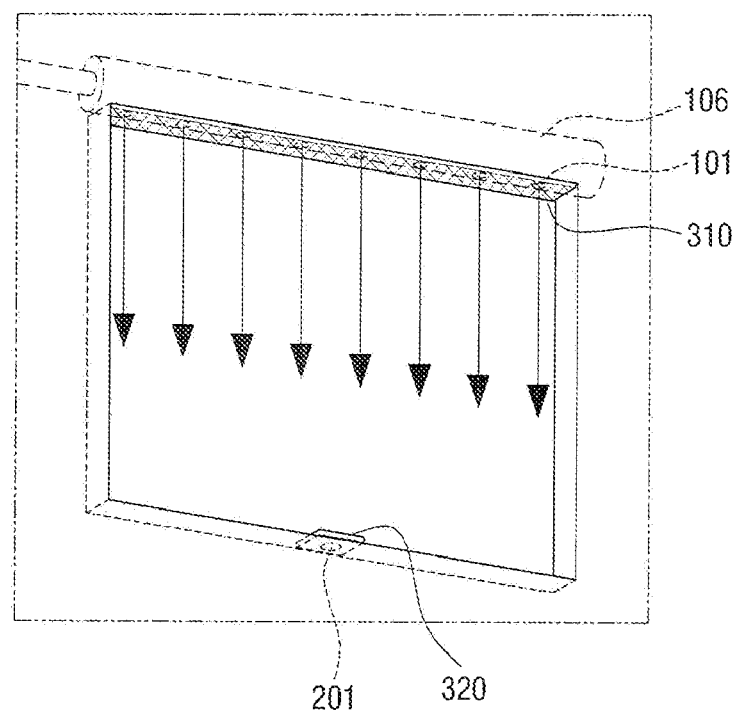

FIGS. 4 to 6 illustrate a dust remover according to an embodiment of the invention in which the air injector 100 may consist of an air pump 104 (see FIG. 5), an air tunnel 105, and an air tank 106.

The air pump 104 may be installed in a space outside the shutter unit 20. One or a plurality of air pumps may be installed. The air tank 106 may be connected to the air pump 104 by the air tunnel 105. A plurality of air injecting holes 101 may be disposed on a bottom surface of the air tank 106, each having a certain distance from one another. The air tank 106 may be formed to have a length corresponding to a width of the charge-coupled device 10. As in the embodiment above, the air injecting holes 101 are formed in the direction of the arrow illustrated in FIG. 4, so that air can flow in a direction parallel with the surface of the charge-coupled device 10. The air tank 106 keeps all of the air provided by the air pump 104 for a while, and makes the air injecting holes 101 inject the air with an even pressure. The inhaled dust collecting filter 310 may be installed on the injecting surface of the air injecting holes 101 to remove pollutants such as dust in the injected air.

The flow of the injected air may remove the dust attached to the surface of the charge-coupled device 10 in a similar manner as in the embodiment above. The air provided by the air pump 104 may fill the air tank 106 and then be injected with a certain flow speed through the plurality of air injecting holes 101. As it flows on the surface of the charge-coupled device 10, the injected air may detach/remove the dust attached to the surface of the charge-coupled device 10. As illustrated in FIG. 6, the air may be collected in the exhausting dust collecting filter 320, which may consist of the electret filter, and then filtered. The air may then be discharged through the air discharging holes 201. The air which penetrated the exhausting dust collecting filter 320 and the air discharging holes 201 may be discharged outside the shutter unit 20 through the air discharging pipe 202. It is possible to install a filter 330 made of an air permeable water-proof material such as Gore-Tex in the air discharging pipe to prevent penetration of water from outside.

The dust collecting filter 300, which can collect dust in both the air injector 100 and the air discharger 200 or in the air discharger 200 only, may prevent the dust which has been removed from the charge-coupled device 10 from being dispersed and reversed and then re-polluting the charge-coupled device 10. Furthermore, the airflow on the surface of charge-coupled device 10, it is also possible to absorb the heat generated in the charge-coupled device 10, preventing malfunction of the device due to overheating in the charge-coupled device 10.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A dust remover which forms an air flow in a space formed between a charge-coupled device and a shutter unit, and removes dust on a surface of the charge-coupled device, the dust remover comprising:
    an air injector which has a plurality of air injecting holes and an air inhaling hole which are formed in the shutter unit;
    an air discharger which is installed on a surface facing the air injector to discharge the air outside the shutter unit, and has at least one air discharging hole which is smaller than each of the plurality of air injecting holes; and
    an exhausting dust collecting filter which is installed in the air discharger, and collects dust in the air being discharged,
    wherein the air injector and the air discharger are disposed in an accommodating groove formed in the shutter unit, and air outside the shutter unit flows into the air inhaling hole and is injected into the space between the charge-coupled device and the shutter unit through the plurality of air injecting holes.

2. The dust remover according to claim 1, wherein the air injector injects air according to a change of volume of a zoom lens installed in a front surface unit of the shutter unit or air flow by rotation of a fan installed in an air cap.

3. The dust remover according to claim 2, wherein the air injector further comprises: an air tube including at least a first end and a second end, wherein the first end is connected to the air inhaling hole, and the second end is connected to the plurality of air injecting holes.

4. The dust remover according to claim 1, wherein the air injector comprises: at least one air pump; an air tank which holds air formed in the air pump; and an air tunnel which connects the air pump and the air tank, wherein the plurality of air injecting holes are formed on a bottom surface of the air tank.

5. The dust remover according to claim 4, further comprising: an inhaled dust collecting filter which is installed in the air injector, and collects dust in the air being inhaled.

6. The dust remover according to claim 4, wherein the air discharging holes are smaller than the air injecting holes, and wherein one of the air discharging holes is formed in a middle of a surface facing a surface where the air injecting holes are formed.

7. The dust remover according to claim 4, wherein the air injecting holes are disposed on an upper side of the air discharging holes in a gravity direction.

8. The dust remover according to claim 4, wherein the air flow between the air injecting holes and the air discharging holes is formed in a direction parallel with a surface of the charge-coupled device.

9. The dust remover according to claim 4, wherein the exhausting dust collecting filter is an electret filter.

10. The dust remover according to claim 4, wherein the air discharger further comprises: an air discharging pipe having a first end a second end, wherein the first end is connected to the air discharging holes, and the second end is connected to an outside of the shutter unit; and a filter which is made of an air permeable water-proof material.

* * * * *